United States Patent [19]

Schoenmakers

[11] 4,329,723

[45] May 11, 1982

[54] ADJUSTABLE MOUNTING FOR A MAGNETIC TAPE HEAD

[75] Inventor: Johannes J. M. Schoenmakers, Eindhoven, Netherlands

[73] Assignee: U.S. Philips Corporation, New York, N.Y.

[21] Appl. No.: 121,337

[22] Filed: Feb. 13, 1980

[30] Foreign Application Priority Data

Feb. 16, 1979 [NL] Netherlands .......................... 7901230

[51] Int. Cl.³ .......................... G11B 21/24; G11B 5/56
[52] U.S. Cl. ..................................................... 360/109
[58] Field of Search ............................ 360/109, 130.21

[56] References Cited

U.S. PATENT DOCUMENTS

| | | | |
|---|---|---|---|
| 3,155,359 | 11/1964 | Hogan et al. | 360/109 |
| 3,649,773 | 3/1972 | Trammell | 360/109 |
| 4,052,745 | 10/1977 | Nakamichi | 360/109 |
| 4,086,638 | 4/1978 | Saito | 360/109 |
| 4,268,881 | 5/1981 | Saito | 360/109 |

*Primary Examiner*—Robert S. Tupper
*Attorney, Agent, or Firm*—David R. Treacy

[57] ABSTRACT

An apparatus for recording and/or reproducing signals on a magnetic tape, having an azimuth adjustment for the gap of the magnetic head. At least one fixed support on a head plate has a slotted opening for receiving the free end of a tab on the head support, to form a knife-edge bearing about which the head and support are pivoted. A tape guide is formed on the head support immediately adjacent the tab.

9 Claims, 7 Drawing Figures

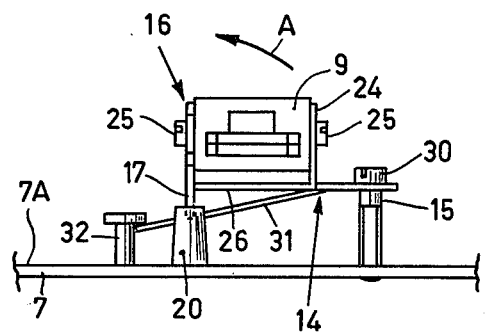 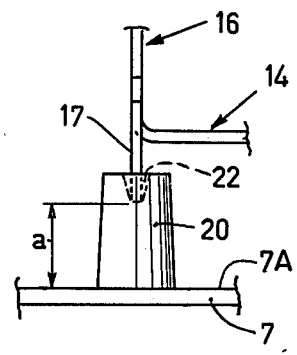
FIG. 2  FIG. 3
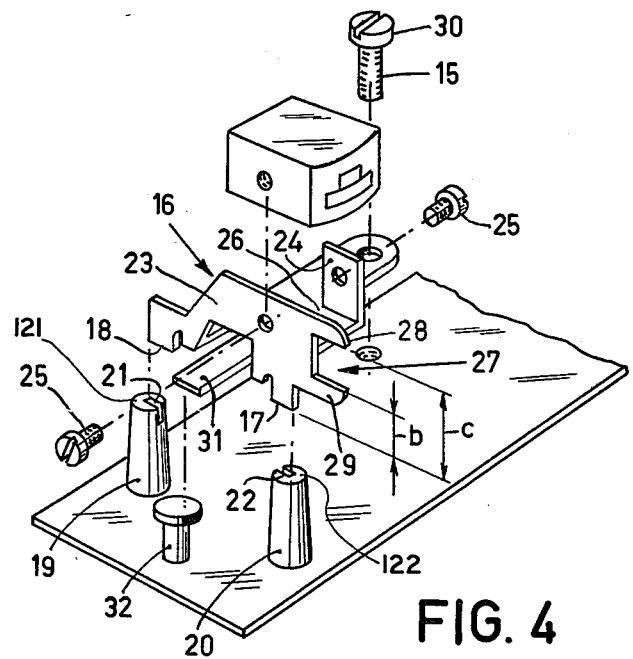
FIG. 4

ADJUSTABLE MOUNTING FOR A MAGNETIC TAPE HEAD

BACKGROUND OF THE INVENTION

The invention relates to an apparatus for recording and/or reproducing signals on a magnetic tape, and having at least one magnetic head carried on a magnetic head support, which support is positioned at a distance from a head plate by supporting members; and more particularly to such an apparatus in which at least one of these supporting members is rigidly attached and an other supporting member is adjustably attached to the head plate for influencing the azimuth angle adjustment of the magnetic head by pivoting the magnetic head support, and in which the magnetic head is attached to a flat plate member situated near the fixed supporting member and having projecting limbs which constitute a tape guide for guiding the lower and the upper edge of the magnetic tape respectively.

An apparatus of this type is known from U. S. Pat. No. 3,649,773. In this known apparatus the flat plate member comprising the tape guide is spaced from the head plate via the magnetic-head support by a fixed supporting member formed as a cylindrical sleeve. In order to minimize the influence of the adjustable supporting member, constituted by a set screw, on this spacing, the flat plate member is disposed near the fixed supporting member. The flat plate member, which constitutes an integral unit with the magnetic head support, is formed by bending a portion of the support at a right angle. The distance from the tape guide to a reference surface formed by the head plate surface which faces the magnetic head is subject to certain tolerances as a result of this bending operation. These tolerances, to which are added the tolerances of the axial dimension of the cylindrical sleeve, generally result in the tape guide being positioned at a distance to the reference surface different from that of the other tape guides. As the tape guide of any other magnetic head (such as the erase head) is also subject to such a tolerance, the difference in distance as a result of tolerances may be doubled. However, in an apparatus of this general type, for correct tape motion it is essential that the tape guides at the magnetic head are positioned equidistantly relative to the reference surface with the greatest accuracy; in the known apparatus the desired accuracy has been attained only by eliminating the above-identified tolerances with the aid of expensive, difficult-to-operate and time-consuming adjusting means.

SUMMARY OF THE INVENTION

It is the object of the invention to position the tape guide of a magnetic head in such apparatus as accurately as possible, in a simple manner, and without the use of adjusting means.

According to the invention the flat plate member also comprises at least one tab which extends in the direction of the head plate; and the fixed supporting member is formed with a slotted opening which widens in the direction of the magnetic head support, with which opening the free end of the tab cooperates as a knife-edge bearing for pivoting the magnetic head support.

By thus defining the distance from the tape guide to the reference surface by means of two parts which can be manufactured very accurately (the fixed support and the flat plate member), the tape guide need not be adjusted relative to the head plate, and it is ensured that any deviations in the distances of the various tape guides of the magnetic heads to the reference surface are minimal. The dimension of the flat plate member which is critical for this distance, namely the distance from the respective tape guiding edges of the tape guide limbs to the free end of the tab, can be defined very accurately in a so-called blanking die; and as the fixed supporting member can be mounted on the head plate simultaneously with the fixed supporting members of the other magnetic heads by means of precision techniques, such as injection molding, the distances of the fixed supporting members relative to the reference surface can be controlled with respect to each other very accurately.

The elimination of an adjustment of the tape guide by the use of parts which can be manufactured simply, and the ease of assembly, requiring merely the fixation of the adjustable supporting member, simplifies not only the manufacture of the apparatus in accordance with the invention but also servicing.

It is advantageous if in the apparatus in accordance with the invention the longitudinal axis of the slotted opening in the fixed supporting member is perpendicular to the contact face of the magnetic head with the magnetic tape; that is, perpendicular to a plane tangential to the air gap of the head. Further, for retaining the tab the slotted opening, viewed in the longitudinal direction, had an end bounded by at least one side of the supporting member.

As a result of this the tab, and thus the tape guide and the magnetic head, can be positioned accurately not only in respect of the distance relative to the head plate reference surface but also in respect of the distance relative to a second reference surface, defined by a plane tangent to the adjacent tape guides.

In this respect in a preferred embodiment the flat plate member has two tabs and for each tab an associated supporting member is formed integral with the head plate, the slotted openings of these integral supporting members being disposed in line with their longitudinal directions and being bounded at the sides of the supporting members remote from each other. This provides a stable arrangement, which is desirable in order to keep the magnetic head and tape guide in the correct position despite the forces exerted by the tape on the magnetic head.

It is to be noted that, in the apparatus in accordance with U.S. Pat. No. 3,649,773, a spring is used to pivotally urge the integrated unit, constituted by the flat plate member and the magnetic head support, at least in one direction. In yet another preferred embodiment in accordance with a invention the spring between the supporting members is attached to such a unit, because as a result of this the unit is urged against the various supporting members with sufficient force to keep the magnetic head and the tape guide in the correct position in spite of the forces exerted by the tape.

In a still further preferred embodiment, the spring is constituted by a strip which together with the support-and-plate unit is formed as one unitary element, the strip being inserted with its free end underneath a fixed element which is integral with the head plate. This not only further simplifies mounting of the unit, but it also yields an accurately defined spring tension, which ensures that the unit retains the correct position.

The invention is described in more detail with reference to the drawing which shows some embodiments, to which the invention is not limited.

BRIEF DESCRIPTION OF THE DRAWING

FIG. 2 is a front elevation, in accordance with the arrow II in FIG. 1, of a magnetic head of the apparatus and its mounting on the head plate.

FIG. 3 shows a part of FIG. 2 on an enlarged scale.

FIG. 4 is a perspective exploded view of parts of the apparatus of FIG. 1.

DESCRIPTION OF THE EMBODIMENTS

Figure 1:
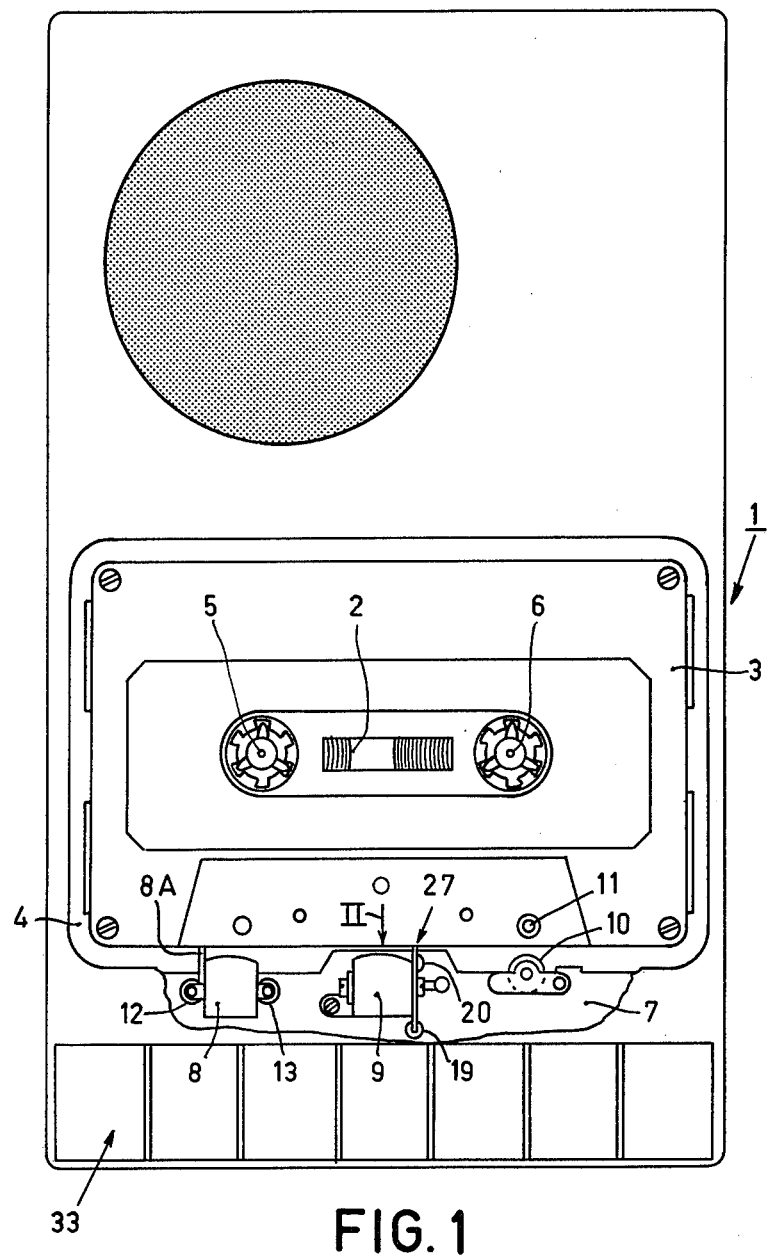
FIG. 1 is a plan view of an apparatus in accordance with the invention.

The apparatus 1 shown in FIG. 1 enables signals to be recorded and/or reproduced on a magnetic tape 2, which is wound around two winding hubs in a generally rectangular cassette 3 and which is passed between the winding hubs along a long side of the cassette.

The apparatus includes a chassis having a deck plate 4, whose upper surface constitutes a supporting surface for the cassette 3. When the cassette is placed on the supporting surface the winding hubs engage winding mandrels 5 and 6 of the apparatus, for coupling to a drive system situated underneath the deck plate 4, as controlled by a keyboard 33.

The apparatus a head plate 7 near the long side of the cassette, the plate carrying an erase head 8 and a combined recording/reproducing head 9. Near its long side the cassette side wall has a number of openings which, by shifting the head plate 7 in the direction of the cassette as a result of operating the keyboard 33, enable the magnetic heads 8 and 9 to be brought into operative contact with the magnetic tape and the magnetic tape to be pressed against a capstan 11 by a pressure roller 10, which capstan extends perpendicularly to the head plates 7 and is part of the drive system.

As is also shown in FIGS. 1 to 4, there are provided a number of stationary supporting members ( 12, 13 and 19, 20) on the head plate 7 for positioning the two magnetic heads (8 and 9 respectively) relative to the head plate 7, which supporting members are rigidly attached to the head plate 7 and which are preferably formed simultaneously on the plate by injection molding (so-called outsert molding), but which may also be formed together with the plate 7. Because of this precision manufacturing technique each of the various supporting members is formed very accurately in respect of the distance a to a reference surface 7A, defined as the surface of the head plate 7 facing the magnetic heads (FIG. 3), and the mutual differences in distance of the supporting members relative to the reference surface 7A are minimal. The erase head 8, on which in this embodiment a tape guide 8A is mounted in an accurate manner during manufacture of the head, is directly mounted on the two fixed supporting members 12 and 13, while the recording/reproducing head 9 is supported by a magnetic-head support 14 which is positioned at its side toward the erase head 8, an adjustable supporting member constituted by a set screw 15. At the side toward the pressure roller 10 the support 14 is located by the two fixed supporting members 19 and 20 via a flat plate member 16 which forms an integral unit with the head support and which has two tabs 17 and 18 which extend in the direction of the head plate 7. For receiving the tabs 17 and 18 the supporting members 19 and 20 are formed with slotted openings 21 and 22 respectively which widen wedge-like in the direction of the magnetic head support 14. The longitudinal axes of the openings extend perpendicularly to a plane tangent to the air gap (the contact face) of the magnetic head 9. The openings 21 and 22 are disposed longitudinally in line with each other and are bounded at the ends which are remote from each other by respective sides 121 and 122 of the members 19 and 20, for retaining the tab 17 and 18 respectively in the longitudinal direction. The free ends of the tabs 17 and 18 are thus capable of cooperating with the openings 21 and 22 respectively as knife-edge bearings, about which knife edge bearing the magnetic head support 14 is pivotable by adjusting the set screw 15 so as to influence the azimuth-angle adjustment of the magnetic head 9.

The unit comprising the magnetic head support 14 and the plate member 16 is preferably manufactured from a thin sheet material. The plate member 16 has a wall portion 23, and the support 14 has a wall portion 24, between which wall portions the magnetic head 9 is an interference fit, the head being secured to the wall portions 23 and 24 by screws 25. Instead of screws it is equally possible to secure the magnetic head 9 to the wall portions by means of spot-welding or glueing.

The wall portions 23 and 24 extend at right angles to a base portion 26 of the magnetic head support, which portion preferably extends substantially parallel to the reference surface 7A and to the supporting surface of the cassette 3. The flat plate member 16, in addition to the wall portion 23 and the tabs 17 and 18, includes a tape guide 27, whose two projecting limbs 28 and 29 extend in the direction of the cassette 3 for respectively guiding the upper and the lower edge of the magnetic tape. Thus, viewed in the elevation of FIG. 2, the limbs 28 and 29 are situated straight above the tabs 17 and 18. By blanking the plate member 16 with the tabs 17 and 18 and the limbs 28 and 29 out of one piece of flat sheet material, the distance from the limbs to a plane through the free ends of the tabs, respectively designated b and c in FIG. 4, may be defined very accurately in a so-called blanking die; a tolerance of ±0.015 mm is found to be feasible.

The base portion 26 extends from the plate member 16 beyond the wall portion 24 and near the free end it has a hole, through which the set screw 15 extends. The base portion 26 is urged against a head 30 of the screw 15 by a spring formed by a strip 31 integral with the support 14 and which within a triangle, formed by connecting lines between the supporting members 15, 19 and 20, adjoins the base portion 26.

The strip 31 extends from the base portion 26 through the space between the supporting members 19 and 20 to the head plate 7. Its end portion which is remote from the base portion is inserted underneath a collar post 32 extending from and integral with the plate 7, the spring tending to pivot the support-and-plate unit about the knife-edge bearing in the direction of the arrow A in FIG. 2. With this arrangement of the spring the unit is urged against the various supports with an accurately defined spring force.

The apparatus parts supported by the head plate 7 and described in the foregoing can be mounted in a simple yet accurate manner. After the magnetic head 9 has been secured to the wall portions 23 and 24, the tabs 17 and 18 are fitted in the openings 21 and 22, with the strip 31 underneath the collar 32. The screw 15 on the plate 7 is then tightened, the base portion 26 being pressed against the head 30 of the screw 15 under the influence of the spring force, so that finally the azimuth angle of the magnetic head is adjusted with the screw 15. After the magnetic heads 8 and 9 have been mounted the arrangement of the tape guide and of the magnetic heads ensures that any deviations in respect to the distance to the reference plane 7A and the tape guides 8A and 27 are minimal and that a connecting line between the respective tape guiding edges of the tape guides 8A and 27 suitably extends perpendicularly to the capstan 11. As the openings 21 and 22 are bounded in the longitudinal direction, the tabs 17 and 18 and the magnetic head 9 are not only positioned accurately in respect of the distance to the reference plane 7A, but also in respect of the distance to the long wall of the cassette 3 and to the magnetic tape contained in the cassette, without the risk of this alignment being disturbed by forces exerted by the tape. Moreover, by thus minimizing the cumulative tolerances, the penetration depth of the magnetic head into the cassette 3 when the head plate 7 is moved is accurately defined. By means of the set screw 15 the azimuth angle of the magnetic head can be adjusted precisely, the magnetic head support 14 pivoting accurately about the free ends of the tabs 17 and 18; and considering the normally small angular rotations in the case of azimuth changes this adjustment can be performed without thereby affecting the position of the tape guide 27 relative to the reference surface 7A. Thus, by the use of fixed supporting members and a flat plate member, which are easy to manufacture, separate adjustment of the tape guides of the magnetic heads 8 and 9 is superfluous, so that an accurate guidance of the magnetic tape is obtained in an economically very attractive manner.

Figure 5:
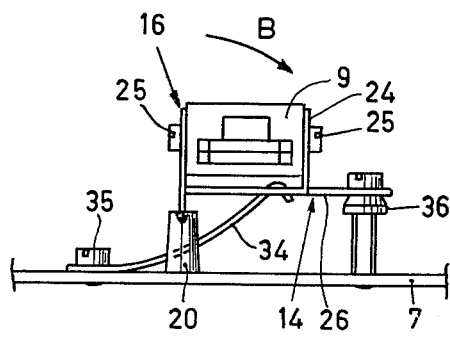
FIG. 5 is an elevation, in accordance with the arrow II in FIG. 1, of a magnetic head in a second embodiment of the apparatus in accordance with the invention and its mounting on the head plate.

In the second embodiment, shown in FIG. 5, a separate leaf spring 34 is used instead of the strip 31. This spring is clamped underneath a screw 35, at the spring end which is remote from the base portion 26. As the spring 34 tends to pivot the magnetic head in the direction indicated by arrow B, the adjustable supporting member is constituted by a shoulder screw 36. By means of this construction the same positioning accuracy can be realized as with that in accordance with the first embodiment, the spring 34 being adaptable as required.

Figure 6:
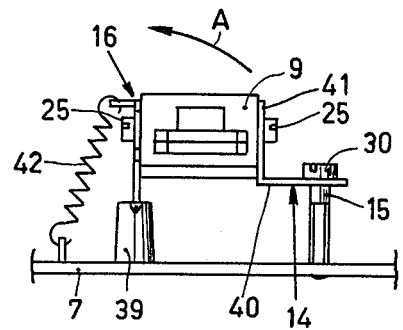
FIG. 6 is an elevation, in accordance with the arrow II in FIG. 1, of a magnetic head in a third embodiment of the apparatus and its mounting on the head plate.
Figure 7:
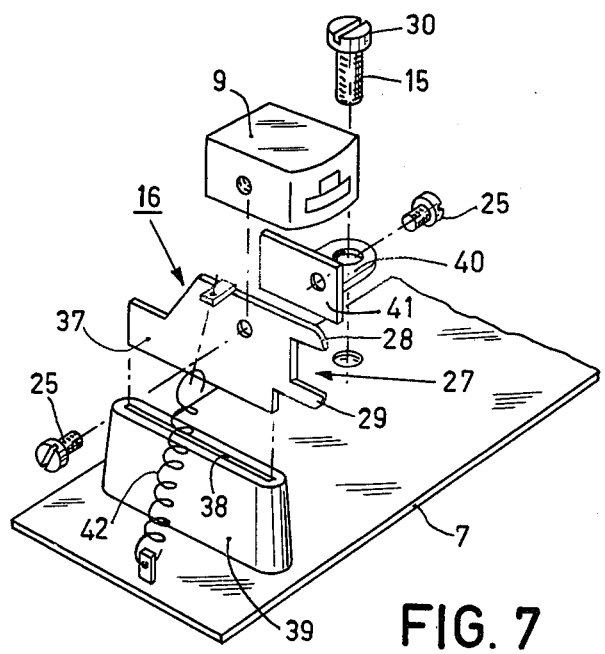
FIG. 7 is a perspective exploded view of the head and mounting parts of the embodiment of FIG. 6.

In the third embodiment, shown in FIGS. 6 and 7, the flat plate member 16 is a part which is separate from the magnetic head support 14, the plate member 16 having only one tab 37, which is inserted in a partly slotted opening 38 of one fixed supporting member 39. The magnetic head support 14 comprises a base portion 40, which is disposed adjacent the magnetic head, and a wall portion 41, which is attached to the magnetic head 9 by a bolt 25. Furthermore, a tension spring 42 is used, which in a similar way as in the first embodiment tends to pivot the magnetic head support in the direction indicated by the arrow A. The use of a separate plate member 16 provides a high degree of flexibility for example in respect of mounting the tape guide on various types of magnetic heads. The closed-end slotted opening 38 can provide the desired stability for the positioning of the plate member 16. However, it is alternatively possible to use a separate plate member with two supports and two tabs, as in the previous embodiments. It is to be noted that in the previous embodiment it is also possible to use only one supporting member (such as the supporting member 39) with one tab.

The constructions of the embodiments described in the foregoing may be used to advantage for accurately positioning a plurality of magnetic heads relative to each other, for example in equipment with separately arranged recording and reproducing heads. Moreover, their use is not restricted to apparatus operating with a magnetic tape accommodated in a cassette, but the construction described may also be used with great advantage in equipment operating with magnetic tape contained on reels, which equipment will generally be provided with a plurality of magnetic heads.

Although the constructions described relate to recording and/or reproducing heads, the constructions of the flat plate member and the magnetic head support for obtaining a most accurate positioning of the magnetic heads relative to each other may also be used advantageously in conjunction with erase heads (such as the erase head 8), in which case mounting on fixed supporting members will suffice, because erase heads generally require no adjustment of the azimuth angle.

What is claimed is:

1. An apparatus for recording and/or reproducing signals on a magnetic tape, having a head plate, supporting members connected to the head plate, a magnetic head support positioned at a distance from the head plate by the supporting members, and at least one magnetic head carried on the magnetic head support, at least one of said supporting members being a fixed supporting member rigidly attached to the head plate, and another supporting member being an adjustable supporting member for varying the distance of a portion of the magnetic head support from the head plate, for influencing the azimuth angle adjustment of the magnetic head by pivoting the magnetic head support; and a flat plate member attached to said magnetic head support and having projecting limbs which constitute a tape guide for guiding the lower and the upper edges of the magnetic tape respectively, wherein the flat plate member further comprises at least one tab having a free end extending in the direction of the head plate, the fixed support member having a slotted opening which widens wedgelike in the direction of the magnetic head support, in which opening the free end of the tab is received and bearing against the fixed support member, and the apparatus further comprises means for biasing said tab toward the head plate, said fixed supporting member and adjustable supporting member being so arranged with respect to each other and the magnetic head that the magnetic head support pivots about the free end of the tab where the tab bears against the fixed supporting member in response to adjustment of the adjustable supporting member to influence azimuth angle.

2. An apparatus as claimed in claim 1, wherein the slotted opening has a longitudinal axis arranged perpendicular to a plane tangential to the air gap of the magnetic head, the opening having an end bounded by at least one side of the supporting member as viewed in the longitudinal direction, for retaining the tab.

3. An apparatus as claimed in claim 2, wherein said flat plate member comprises two tabs, and the apparatus includes two said supporting members integral with the head plate, for respectively receiving said tabs, the slotted openings of said supporting members being aligned on their longitudinal axes and having respective ends bounded by the sides of the supporting members remote from each other.

4. An apparatus as claimed in claim 1, 2 or 3, wherein the flat plate member constitutes an integral unit with the magnetic head support, and said means for biasing comprises a spring so arranged that it also urges said mounting unit pivotally about the free end of said tab, the spring being attached to the unit between the supporting members.

5. An apparatus as claimed in claim 4, wherein the head support, the flat plate member, and the spring are one unitary element, the spring being formed as a strip having a free end, and the head plate includes a fixed element formed integrally with the head plate, said spring free end being inserted under said fixed element.

6. A magnetic head assembly for recording and/or reproducing signals on a magnetic tape, comprising a magnetic head support and a magnetic head attached to the support, said support being adapted to be positioned at a distance from a head plate of a recording and/or reproducing apparatus by support members of the apparatus, and a flat plate member attached to said magnetic head support and having projecting limbs which constitute a tape guide for guiding the lower and the upper edges of a magnetic tape respectively, wherein the flat plate member further comprises at least one tab extending in a given direction and having a free end defining an axis arranged with respect to the magnetic head and the projecting limbs such that pivoting of the assembly about the tab free end axis changes the azimuth angle adjustment of the magnetic head with respect to a tape, and means for biassing said support in said given direction, and means adapted for cooperation with an adjustable supporting member of a tape apparatus for pivoting the assembly about said free end by varying the distance of a portion of the magnetic head support from a head plate of the apparatus, for adjustment of the azimuth angle of the head.

7. An assembly as claimed in claim 6 wherein said flat plate member comprises two said tabs, having their free ends aligned to define said axis about which the magnetic head support may be pivoted for azimuth angle adjustment.

8. An assembly as claimed in claim 7, wherein the flat plate member constitutes an integral unit with the magnetic head support, and said means for biassing is arranged to act between said tabs.

9. An assembly as claimed in claim 8, wherein the head support, flat plate member, and spring are one unitary element, the spring being formed as a strip extending from the head support and having a free end.

* * * * *